United States Patent [19]

Delassus

[11] 4,131,813
[45] Dec. 26, 1978

[54] ELECTROMAGNETIC APPARATUS GENERATING A GLIDING MAGNETIC FIELD

[75] Inventor: Jean Delassus, Montmorency, France

[73] Assignees: Institut de Recherches de la Siderurgie Francaise (Irsid), St. Germain-en-Laye; Compagnie Electromecanique, Paris, both of France

[21] Appl. No.: 814,423

[22] Filed: Jul. 11, 1977

[30] Foreign Application Priority Data
Jul. 12, 1976 [FR] France .......................... 76,21372

[51] Int. Cl.² ............................................. H02K 41/02
[52] U.S. Cl. ........................................ 310/13; 318/135
[58] Field of Search ................................. 310/12–13; 318/121, 135

[56] References Cited
U.S. PATENT DOCUMENTS

| 782,312 | 2/1905 | Zehden | 310/13 |
| 3,621,311 | 11/1971 | von Starck | 310/13 |
| 3,622,818 | 11/1971 | Payen | 310/13 |
| 3,663,844 | 5/1972 | Kant et al. | 310/13 |
| 3,987,321 | 10/1976 | Wilhelmt | 310/13 |

Primary Examiner—Donovan F. Duggan
Attorney, Agent, or Firm—Kurt Kelman

[57] ABSTRACT

An electromagnetic apparatus comprising two inductors generating a gliding magnetic field. Each inductor has a plane active face and the faces of the two inductors define a parallelepiped space therebetween to receive an armature. A plurality of pairs of rectilinear electrical conductors at each active face are associated to form two-phase imbricated windings connected in series within each inductor. The input conductor of each inductor is connected to the output conductor to form a single closed winding connected as a Wheatstone bridge. A two-phase generator feeds electric energy to the input conductors, one phase of the generator being connected between the points of junction of the two-phase windings of one inductor and the other generator phase is connected between the points of junction of the two inductors.

3 Claims, 4 Drawing Figures

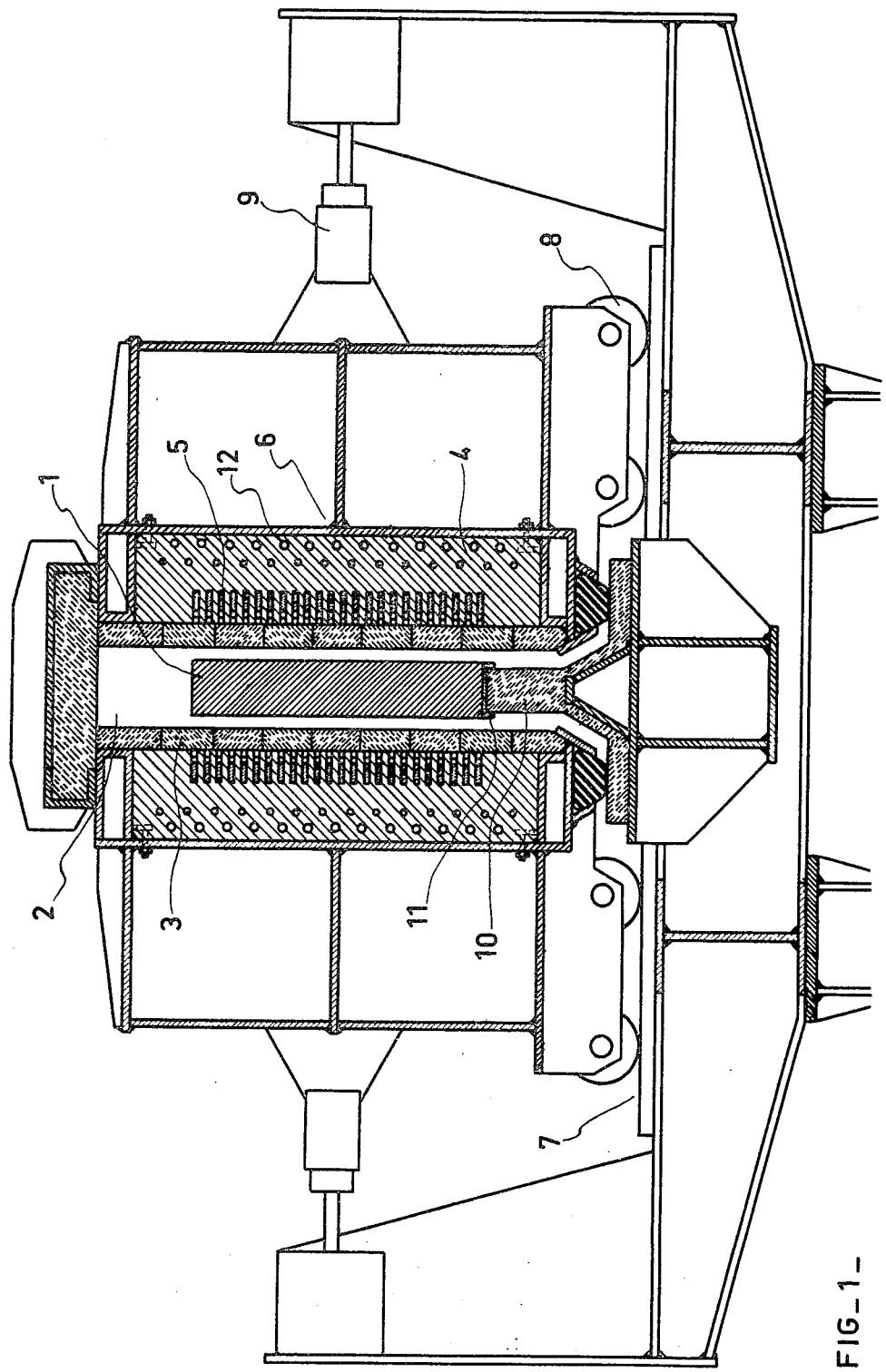
FIG_1

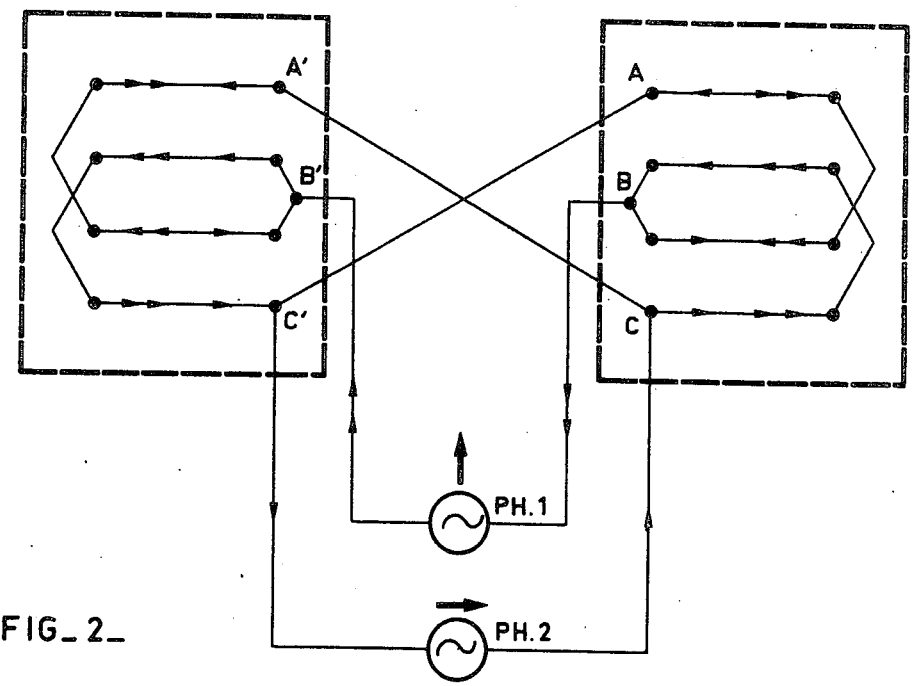
FIG_2_
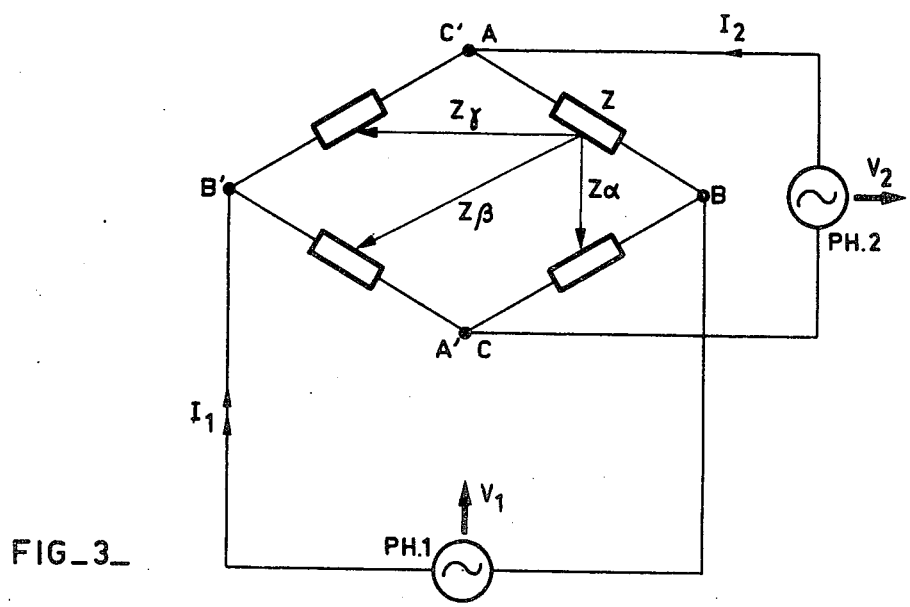
FIG_3_

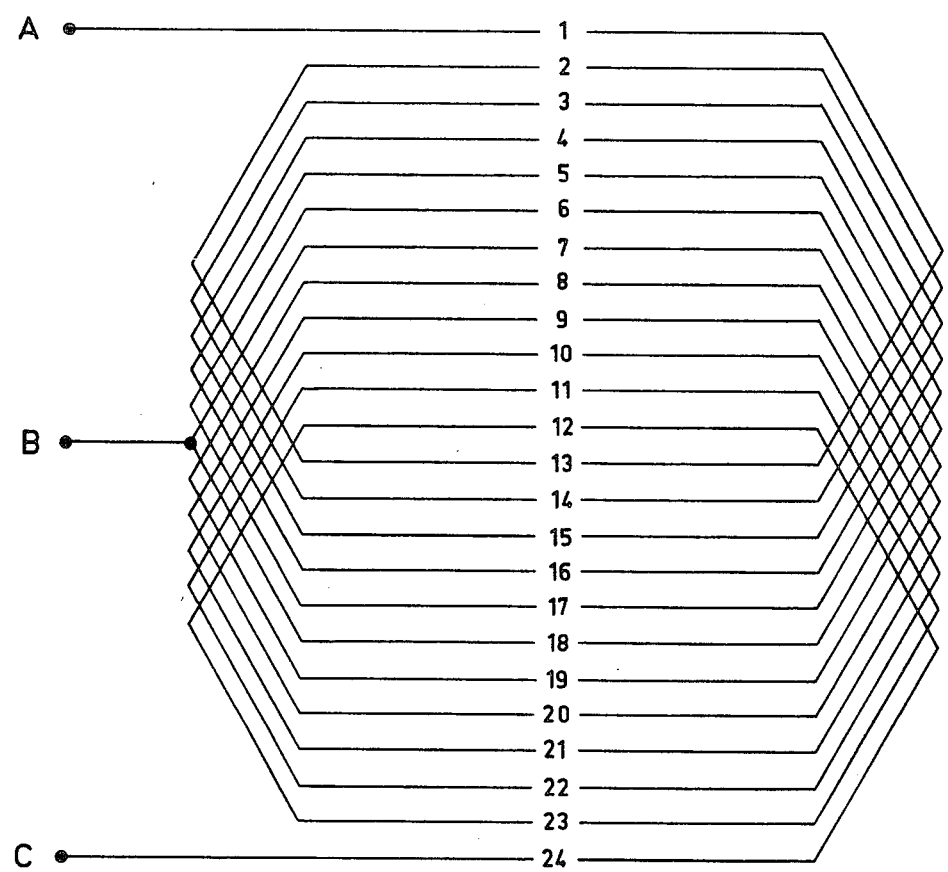
FIG_4_

ELECTROMAGNETIC APPARATUS GENERATING A GLIDING MAGNETIC FIELD

The present invention relates to improvements in the electrical current feed systems of an electromagnetic apparatus which comprises polyphase electromagnetic inductors generating travelling electro-magnetic fields which are displaced in translation, also known as gliding electromagnetic fields, of the general type using two inductors constituting the stator of a linear motor fed by polyphase current or for heating electrically conductive objects having plane faces and used as armature between the inductors.

It is known that, when use is made of polyphase inductors of this type with a small number of poles and a length which is small in relation to the other dimensions of the inductor, either for linear motors wherein the translation force produced by the gliding magnetic field is utilized or for heating objects wherein the energy dissipated within the object is utilized, the asymmetry of the geometric position of the phases of the inductor in relation to the terminals of the system as well as to the armature, i.e. the heated object, brings about a significant electrical unbalance and corresponding differences in the currents and voltages of the phases. This, in turn, produces a great difference in the charge between the phases of the electric current generator, the more strongly charged phase being that feeding the primary winding situated at the input of the inductor (the terminal by which the gliding magnetic field "enters" the system), while the output phase almost does not work at all.

It must be mentioned that the unbalance is due to two different causes in a three-phase inductor: a spatial dissymmetry based on the different position of the phase circuits with respect to the terminals of the system and time dissymmetry due to the difference in phase of the currents running through these circuits. The combination of these two dissymmetries is necessary to create the gliding field. This leads to the differentiation of the role of the terminals, one at the input and the other at the output of the gliding field, and it creates thereby an electromagnetic unbalance between the circuits adjacent one or the other terminal. With a two-phase inductor, it is possible to obtain perfect spatial symmetry, each phase being able to occupy a symmetrical position in relation to the other with respect to the terminals. On the other hand, the electromagnetic dissymmetry remains since the phase currents are out of phase by $\pi/2$ so that one of the terminals becomes the input and other other one becomes the output.

This invention has the object of remedying these disadvantages and to provide an electromagnetic system with a gliding field whose electrical current feed system is balanced in voltage as well as in current.

This and other objects are accomplished in accordance with the invention with an electromagnetic apparatus comprising two inductors adapted to generate a gliding magnetic field, each of the inductors having a respective plane active face. The plane faces of the inductors define therebetween a substantially parallelepiped space for receiving an electrically conductive body to constitute an armature between the inductors. A plurality of pairs of rectilinear electrical conductors including an input conductor and an output conductor are disposed at each of the active faces of the inductors. The pairs of conductors are associated to form two-phase imbricated windings connected in series at the middle of each of the inductors, the input conductor of each of the inductors being connected to the output conductor of the other inductor to form a single closed winding connected as a Wheatstone bridge. A two-phase generator feeds electric energy to the windings, one of the phases of the generator being connected between the points of junction of the two-phase windings of each of the inductors and the other phase of the generator being connected between the points of junction of the two inductors.

The basic principle of the present invention may be viewed from two closely complementary points of view. From one point of view, this invention associates an "input" winding of one inductor with an "output" winding of the other inductor, and vice versa so that the two assemblies act in the same fashion with respect to the absorbed electrical charge. From a second point of view, the four windings are associated as the branches of a balanced Wheatstone bridge whose diagonals are respectively fed by the two phases of a two-phase generator so that the two phases are electrically disconnected from each other and thus do not discharge into each other. The combination of these phenomena obtains the desired unitary result, i.e. the production of a gliding field of great power in a polyphase electromagnetic system with a balanced polyphase electric energy feed, that is, without substantially reverse current. It will be understood that the structure of the invention necessarily requires the electric current delivery to be a two-phase power source. Since industrially available electric power sources are usually three-phase systems, a conventional transformer is used to change the three-phase to a two-phase system, a "Scott" transformer being the most convenient.

A two-phase inductor wound in the manner herein disclosed will have spatial as well as electromagnetic symmetry.

The above and other objects, advantages and features of the present invention will become more apparent from the following detailed description of one preferred embodiment thereof, given by way of example and without limiting this invention thereto, taken in conjunction with the accompanying drawing wherein FIG. 1 is a transverse vertical section of a cell of a furnace for heating a steel slab;

FIG. 2 is a diagram showing the bridge circuit of the two inductors of the furnace, in principle;

FIG. 3 shows the bridge circuit of FIG. 2 symbolically; and

FIG. 4 shows a connection diagram of the conductive bars of the inductor.

Referring first to FIG. 1, this is identical with FIG. 1 of copending U.S. patent application Serial No. 760,431 filed Jan. 18, 1977, for an "Induction Heated Furance with a Gliding Magnetic Field", of which I am a joint inventor. The structure and operation of this furnace has been fully described and illustrated in the copending application, the sole difference thereover being the electric circuit feeding current to the inductors in accordance with the invention, as hereinafter particularly described.

In the furnace of FIG. 1, steal slab 1 is shown mounted upright in heating space 2 of a furance defined by vertical lateral walls 3 which are of refractory material to insulate space 2 from two plane inductors 4 which are disposed face-to-face, each inductor being associated with a respective one of the walls and being supported on support frame 6. The inductors define twenty-four horizontal slots 5 along the refractory walls into each one of which is placed a conductive bar of the Roebel type, cooled by circulating water and constituting the conductive windings of the inductor. The inductors are mounted in welded support frames 6 for movement perpendicular to the wall on rollers or wheels 8 running on rails 7. Hydraulic jacks 9 connect each inductor-support frame assembly to a support base to move the assembly.

The steel slab is mounted on insulating stand 10 of a strong refractory material, collar 11 refractory, preferably non-magnetic, steel being interposed between stand 10 and slab 1.

Cooling of the magnetic mass of the inductors is assured by longitudinal channels 12 machined into the inductors and carrying a heat exchange fluid for circulation through the inductors.

As indicated hereinabove, the structure and operation of the furnace is more fully described in the copending application whose pertinent disclosure in this respect is incorporated herein by way of reference.

Each inductor is connected in a two-phase circuit. It comprises twenty-four conductive bars, i.e. twelve bars per phase, in serially imbricated windings, as conventional. Each coil of the windings is formed by a bar of rank i connected in series with a bar of rank i+12 so that the same current circulates in opposite directions through the connected bars.

FIG. 2 is a simplified schematic diagram of a bridge circuit according to this invention, wherein the two inductors have been assumed to be flattened into a single plane parallel to the plane of FIG. 1, by symmetric rotation with respect to a median vertical plane of the furnace, which extends perpendicularly to the plane of FIG. 1. In this figure, each inductor has been shown by a rectangle in broken lines and each horizontal bar represents actually six conductive bars connected either in parallel or in series, series connection being preferred for high powers. The four phase windings thus constituted are connected by a bridge circuit in the form of a Wheatstone bridge, as illustrated in FIG. 3.

It will be appreciated that this system is entirely symmetrical. The four phase windings form the four branches of a Wheatstone bridge with complex impedances. The two phases PH.1 and PH.2 of the two-phase generator are respectively disposed in a diagonal of the bridge. Each branch of the bridge has a proper impedance Z and mutual impedances with the three other branches, $Z\alpha$, $Z\beta$, and $Z\gamma$, respectively as shown in FIG. 3. The combination of these different complex impedances places the bridge in balance and prevents any of the two diagonals from discharging into the other.

It is actually possible to prove by a complex calculation that the currents of phase $I_1$ and $I_2$ are given by the following equations:

$$I_1 = \frac{V_1}{Z_1} \text{ and } I_2 = \frac{V_2}{Z_2},$$

wherein $Z_1 = Z + Z\alpha + Z\beta + Z\gamma$ and $Z_2 = Z - Z\alpha + Z\beta - Z\gamma$.

The above calculations show that the current of each phase depends solely on the voltage of this phase, i.e. each phase is fully independent and disconnected from the other. Therefore, if voltages $V_1$ and $V_2$ have a difference in phase of 90° at no load (two phase current delivery), they keep the same difference in phase under load although the power factor ($\cos \phi$) is different in the two diagonals and the reactance of the transformer is not negligible. Furthermore, since the real parts of impedances $Z_1$ and $Z_2$ are different, there is a difference in the charge (real power) between the two phases.

The voltages at the terminals of the diagonals of the bridge are given, respectively, by the folliwing vector relations:

$$\vec{V}_{BA} = \frac{\vec{V}_1 - \vec{V}_2}{2} \text{ and } \vec{V}_{CB} = \frac{V_1 + V_2}{2}$$

These equations show that, for a two-phase voltages delivery, i.e. out of phase by $\pi/2$, and the vectors $\vec{V}_1$ and $\vec{V}_2$ being orthogonal, amplitudes $\vec{V}_{BA}$ and $\vec{V}_{CB}$ are equal and the voltages are balanced in the four branches of the bridge. However, since the power factor ($\cos \phi$) is different in the two diagonals, the currents in branches $\vec{I}_{AB}$ and $\vec{I}_{AC}$ are not exactly out of phase by 90° and are not exactly of the same amplitude. This unbalance remains, however, low, i.e. less than 10%.

The electrical diagram for the connection of the twenty-four conductive bars of an inductor is shown in FIG. 4, the two inductors being identical. Each of the twelve first bars of rank i is connected in series with the bar of rank i+12, the latter being reconnected in series with bar I+1. Phase AB is thus composed of bars 1 to 6 and 13 to 18 while phase BC is composed of bars 7 to 12 and 19 to 24.

In an experimental run of a furnace constructed in accordance with FIG. 1, steel slabs having a dimension of 250×1200×4000 mm and a weight of about nine tons, were heated, each inductor of the furnace having twenty-four Roebel type conductive bars measuring 80×27 mm and disposed in correspondingly dimensioned slots separated by 23 mm of magnetic material. The polar pitch was equal to 0.6 m. The effective current intensity in each bar was 12,000 ampere at 50 Hz. The air gap between the inductors and the steel slab was 110 mm. Under these operating conditions, the real power transmitted to the slab by the two inductors was 2.8 MW.

The advantage of the invention resides in the electrical balance of the system. With inductors fed in the conventional manner, the ratio of the resepective impedances of the input and output phases are about 3 to 1 while the power factor is, respectively, of the order of $\cos \phi_1 = 0.14$ and $\cos \phi_2 = 0.03$.

In the electrical current feed system of this invention, the following conditions are met:

Cos $\phi_1$ = 0.10, cos $\phi_2$ = 0.07, $Z_1$ = 0.74 and $Z_2$ = 0.84.

It will thus be appreciated that the unbalance is considerably reduced since the ratio of the power factors is reduced from almost 5 to less than 1.5 and the ratio of the impedances is reduced from 3 to a value of approximately 1. Therefore, such an electric current feed system is practically balanced.

The present invention may be utilized with inductors of any voltage and any number of pairs of inductors.

The electromagnetic apparatus of the present invention may be used for various purposes requiring a gliding electromagnetic field, whenever it is possible to associate two identical inductors disposed identically with respect to an armature, whether it is primarily for the purpose of obtaining a force or movement, such as in linear motors, liquid pumping systems, stirring or the like, or for heating, such as in furnaces, thermal treatment systems and the like.

What I claim is:

1. An electromagnetic apparatus comprising two inductors adapted to generate a gliding magnetic field, each of the inductors having a respective plane active face, the plane faces of the inductors defining therebetween a substantially parallelepiped space, for receiving an electrically conductive body to constitute an armature between the inductors, a plurality of pairs of rectilinear electrical conductors including an input conductor and an output conductor at each of the active faces of the inductors, the pairs of conductors being associated to form two-phase imbricated windings and connected in series at the middle of each of the inductors, the input conductor of each of the inductors being connected to the output conductor of the other inductor to form a single closed winding connected as a Wheatstone bridge, and a two-phase generator feeding electric energy to the input conductors, one of the phases of the generator being connected between the points of junction of the two-phase windings of each of the inductors and the other phase of the generator being connected between the points of junction of the two inductors.

2. The electromagnetic apparatus of claim 1, wherein the conductors of each inductor are connected to form two-phase imbricated windings with distributed poles.

3. The electromagnetic apparatus of claim 1, wherein a plurality of said pairs of inductors are associated, with each two inductors connected to the Wheatstone bridge.

* * * * *